(12) United States Patent
Morita

(10) Patent No.: US 11,880,623 B2
(45) Date of Patent: Jan. 23, 2024

(54) CONTROL METHOD AND IMAGE FORMING SYSTEM FOR REMOTE CONNECTION AND OPERATING

(71) Applicant: TOSHIBA TEC KABUSHIKI KAISHA, Tokyo (JP)

(72) Inventor: Hiroaki Morita, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/944,051

(22) Filed: Sep. 13, 2022

(65) Prior Publication Data

US 2023/0086808 A1 Mar. 23, 2023

(30) Foreign Application Priority Data

Sep. 21, 2021 (JP) ................................. 2021-153435

(51) Int. Cl.
*G06F 3/12* (2006.01)

(52) U.S. Cl.
CPC .......... *G06F 3/1287* (2013.01); *G06F 3/1222* (2013.01); *G06F 3/1238* (2013.01); *G06F 3/1292* (2013.01)

(58) Field of Classification Search
None
See application file for complete search history.

(56) References Cited

U.S. PATENT DOCUMENTS

| 5,459,579 A * | 10/1995 | Hu .......................... G06F 40/12 |
| | | 358/401 |
| 2012/0075658 A1* | 3/2012 | Yasui ..................... G06F 3/1253 |
| | | 358/1.14 |
| 2019/0026050 A1* | 1/2019 | Pantin .................... G06F 3/1222 |

FOREIGN PATENT DOCUMENTS

| JP | 2009255390 A | 11/2009 |
| JP | 2015139150 A | 7/2015 |

* cited by examiner

*Primary Examiner* — Thomas D Lee
(74) *Attorney, Agent, or Firm* — Kim & Stewart LLP

(57) ABSTRACT

According to one embodiment, a control method for an image forming system includes establishing a remote connection to a first image forming device from a user terminal, then receiving, at the user terminal, screen information generated by the first image forming device and transmitted via the remote connection. The generated screen information is displayed on a display of the user terminal. A user input is received at the user terminal. The user input corresponds to the displayed screen information. For example, the user input selects a print data destination or the like. The user input is sent to the first image forming device.

12 Claims, 11 Drawing Sheets

CONTROL METHOD AND IMAGE FORMING SYSTEM FOR REMOTE CONNECTION AND OPERATING

CROSS-REFERENCE TO RELATED APPLICATION

This application is based upon and claims the benefit of priority from Japanese Patent Application No. 2021-153435, filed Sep. 21, 2021, the entire contents of which are incorporated herein by reference.

FIELD

Embodiments described herein relate generally to an image forming system and a control method for an image forming system.

BACKGROUND

In the related art, an image forming device such as a multifunction peripheral (MFP) is often installed in an office, and likewise operated in the office. However, in recent years, due to the spread of remote work, if the image forming device can only be operated from inside the office, there may be inconveniences to a remote user or the like. For example, if data for documents stored in the image forming device cannot be accessed from outside of the office, some workers may be inconvenienced.

DETAILED DESCRIPTION

In general, according to one embodiment, an image forming system control method and an image forming system by which an operation can be performed with high convenience when an image forming device is being accessed via an external network are provided.

In general, according to one embodiment, a control method for an image forming system includes establishing a remote connection to a first image forming device from a user terminal, then receiving, at the user terminal, screen information generated by the first image forming device and transmitted via the remote connection. The generated screen information is displayed on a display of the user terminal. A user input is received at the user terminal. The user input corresponds to the displayed screen information. The user input is sent to the first image forming device.

Hereinafter, a computer program, a control method, and an image forming system according to certain example embodiments will be described with reference to the following drawings.

Figure 1:
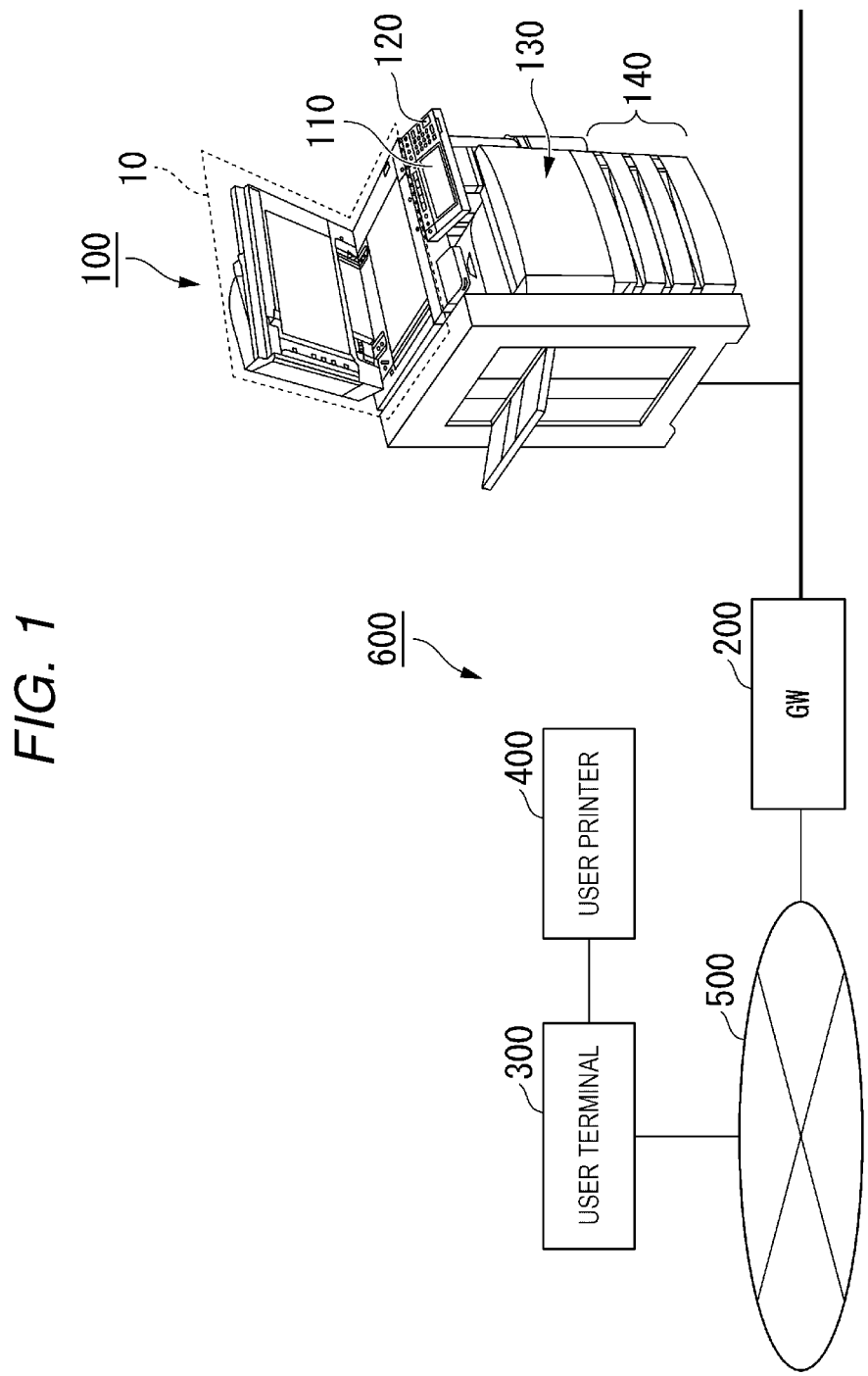
FIG. 1 is a diagram illustrating a configuration example of an image forming system according to an embodiment.

FIG. 1 is a diagram illustrating a configuration example of an image forming system 600 according to an embodiment. The image forming system 600 includes at least one image forming device 100, user terminal 300, and user printer 400. The image forming device 100 forms an image on a sheet. The image forming device 100 is, for example, a multifunction peripheral (MFP). The image forming device 100 is communicably connected to a network 500 via a network such as a Local Area Network (LAN) and a gateway (GW) 200. For example, the network 500 may be the Internet or a mobile communication network.

The user terminal 300 is used when the image forming device 100 is to be operated. The user printer 400 can form an image based on data transmitted from the image forming device 100 according to the control of the user terminal 300. The image forming device 100 and the user terminal 300 are communicably connected to each other via the network 500. The user terminal 300 and the user printer 400 are communicably connected to each other via wired communication or wireless communication.

Figure 2:
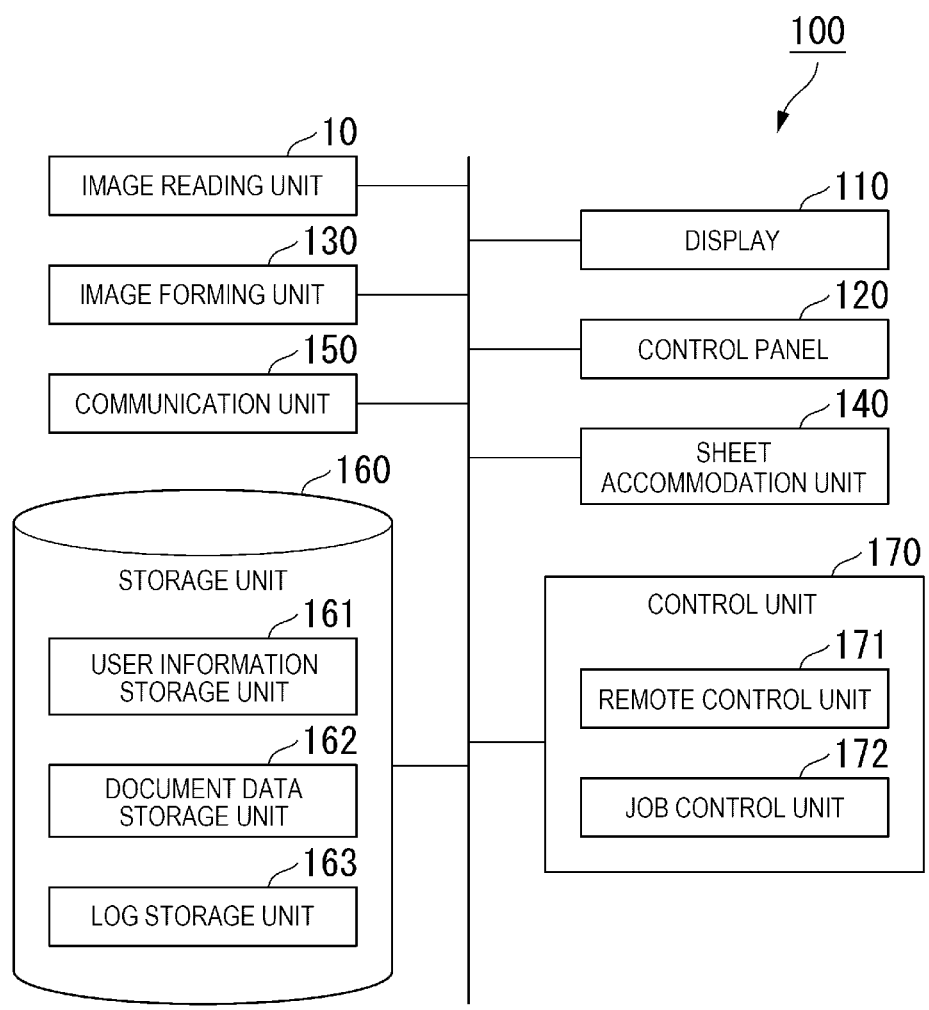
FIG. 2 is a hardware block diagram of an image forming device.

FIG. 2 is a hardware block diagram of the image forming device 100 according to an embodiment. The image forming device 100 includes an image reading unit 10, a display 110, a control panel 120, an image forming unit 130, a sheet accommodation unit 140, a communication unit 150, a storage unit 160, and a control unit 170.

The image forming device 100 prints an image onto a sheet by using a developer such as toner or ink. When the developer is toner, the developer is fixed on the sheet by heating. When the developer is ink, the developer is dropped onto the sheet to form an image on the sheet. The sheet is, for example, paper or a label sheet. In general, the sheet may be of any type as long as the image forming device 100 can form an image on a surface thereof.

The image reading unit 10 reads, based on brightness and darkness of reflected light, image information from a document or the like. The image reading unit 10 may be referred to as a scanner in some contexts. The image reading unit 10 records the obtained image information in the storage unit 160. The image information may be recorded in a document data storage unit 162 as document data or the like. The recorded image information may be transmitted to another information processing device (for example, the user terminal 300) via the network 500. Based on the recorded image information, an image may be printed on a sheet by the image forming unit 130.

The display 110 is an image display device such as a liquid crystal display or an organic electro luminescence (EL) display (OLED). The display 110 displays various kinds of pieces of information related to the image forming device 100. The display 110 displays a screen related to an operation for a user. For example, the display 110 may display a screen prompting the user to perform an action/operation or a screen showing options to the user that might be selected. The various screens that can be displayed are collectively referred to as "operation screens" and each may be referred to individually as an "operation screen". The display 110 may be configured as a touch panel, and may display a screen for accepting an input operation from the user (as a specific example of an operation screen).

The control panel 120 includes an operation device such as a plurality of buttons. The control panel 120 receives an operation from a user. For example, the control panel 120 may accept an input of numbers and characters. For example, the control panel 120 may accept an operation of selecting one or more jobs from candidates displayed on the display 110. The control panel 120 outputs a signal to the control unit 170. This signal corresponds to the input operation performed by the user. The display 110 and the control panel 120 may be configured as an integrated touch panel.

The image forming unit 130 forms an image on a sheet based on the image information generated by the image reading unit 10 or the image information received via the network 500. The image forming unit 130 includes, for example, a photoconductor drum, an exposure device, a developing device, a transfer device, and a fixing device. A conveyance path for the sheet is formed in the image forming unit 130. The sheet to be processed is conveyed by a roller provided on the conveyance path.

The image forming unit 130 forms an image by, for example, the following processes. The exposure device forms an electrostatic latent image on the photoconductor drum based on the image information. The developing device forms a visible image by adhering the developer to the electrostatic latent image.

The transfer device transfers the visible image onto the sheet. The fixing device fixes the visible image on the sheet by heating and pressing the sheet. The sheet on which the image is to be formed may be a sheet from the sheet accommodation unit 140 or may be a manually fed sheet.

The sheet accommodation unit 140 accommodates the sheets to be used for image formation in the image forming unit 130. The sheets are conveyed to the image forming unit 130 by a conveying roller.

The communication unit 150 includes a communication interface. The communication unit 150 communicates with another device (for example, the user terminal 300) via the network 500.

The storage unit 160 includes a storage device such as a magnetic hard disk device or a semiconductor storage device. The storage unit 160 stores data required when the image forming device 100 operates. The storage unit 160 functions as, for example, a user information storage unit 161, a document data storage unit 162, and a log storage unit 163.

The user information storage unit 161 stores information regarding the legitimate users of the image forming device 100. A legitimate user of the image forming device 100 in this context means a user who is authorized (e.g., registered) to operate the image forming device 100. The user information storage unit 161 may store, for example, identification information (a "user ID") for each legitimate user in user information.

The document data storage unit 162 stores the document data. The document data may be, for example, data including text, images, or text and images in combination. The document data may be generated as a print job or the like for forming an image on a sheet.

The log storage unit 163 stores information that indicates a history of a job executed in the image forming device 100. For example, the log storage unit 163 may store the content of an executed job, the date and time of execution, and a user ID of a requesting user in association with one another. The log storage unit 163 may store, for each user (or user ID), the number of times image formation has performed by the user.

The log storage unit 163 may store, for each user, the number of sheets used in the image formation(s) performed by the user.

The control unit 170 includes a processor such as a central processing unit (CPU) and a memory. The control unit 170 reads out and executes a program stored in the storage unit 160. The control unit 170 controls an operation of each unit or component provided in the image forming device 100. The control unit 170 functions as, for example, a remote control unit 171 and a job control unit 172.

The remote control unit 171 communicates with the user terminal 300. In the present embodiment, the user terminal 300 illustrated in FIG. 1 is being used by a legitimate user. The remote control unit 171 makes a remote connection to the user terminal 300 being used by the legitimate user. The remote connection is to establish a communication path for receiving an operation from the user terminal 300 via an external network (for example, network 500) different from a premises (local) network (internal network). The remote connection may be implemented using remote desktop software such as virtual network computing (VNC). The remote connection may be implemented, for example, via a server device or a cloud system.

In the example of FIG. 1, the network inside the GW 200 corresponds to the internal network for the image forming device 100, and the network outside the GW 200 corresponds to the external network. In other words, in the network to which the image forming device 100 is connected, a network whose security is controlled by an administrator is the internal network. On the other hand, a network whose security is not controlled by the administrator is the external network.

By the remote connection, data (screen information) of the operation screen to be displayed on the display 110 (of the image forming device 100) is transmitted to the user terminal 300 and displayed at the user terminal 300. By the remote connection, information that indicates an input operation performed on the user terminal 300 (locally displaying the screen information) can be received by the remote control unit 171. When the remote control unit 171 receives the information indicating the input operation, the remote control unit 171, in effect, also receives the input operation corresponding to the received information. When the image forming device 100 is instructed by the user terminal 300 to execute a job, the job control unit 172 executes the job corresponding to the input operation made at the user terminal 300. When the user printer 400 connected to the user terminal 300 is to be instructed to execute a job, the remote control unit 171 reads the document data for the job from the document data storage unit 162 and transmits the document data to the user terminal 300.

When an instruction to execute a job is received, the job control unit 172 executes the job in response to the instruction. When the execution of the job is completed, the job control unit 172 records, in the log storage unit 163, log information that indicates the history of the execution of the job.

Figure 3:
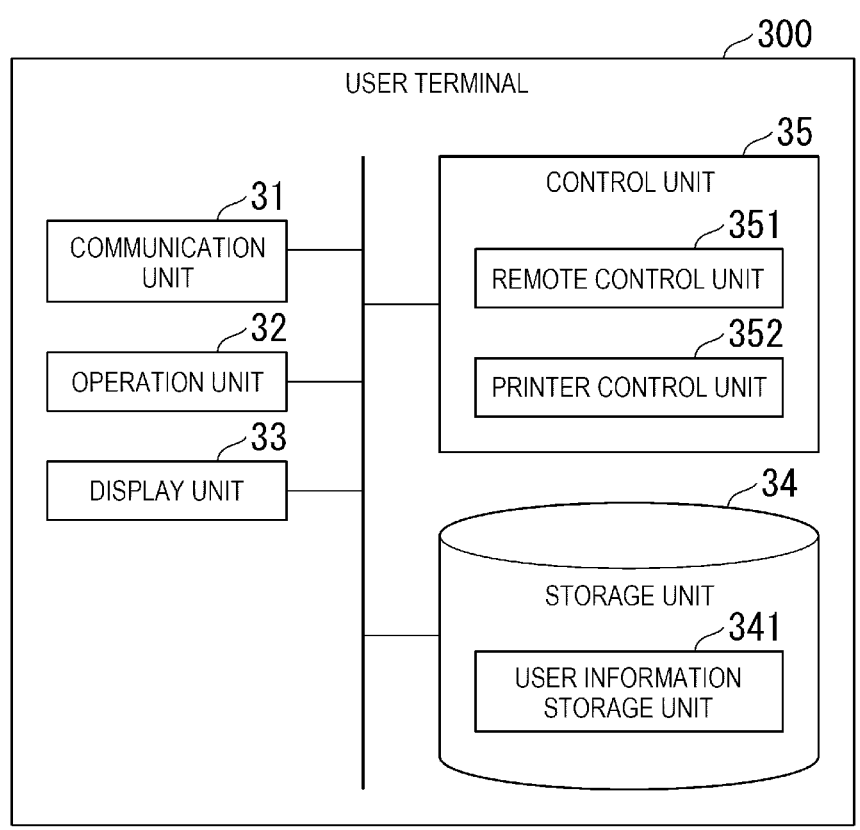
FIG. 3 is a schematic block diagram of a user terminal.

FIG. 3 is a schematic block diagram illustrating a specific example of a functional configuration of the user terminal 300. The user terminals 300 may be information processing devices such as smartphones, tablets, personal computers, portable game machines, stationary game machines, or dedicated remote access devices. The user terminal 300 includes a communication unit 31, an operation unit 32, a display unit 33, a storage unit 34, and a control unit 35.

The communication unit 31 is a communication device. The communication unit 31 may be configured as, for example, a network interface. The communication unit 31 performs data communication with another device via the network 500 in accordance with the control of the control unit 35. The communication unit 31 may be a device that performs wireless communication or may be a device that performs wired communication.

The operation unit 32 can be one or more existing types of input devices such as a keyboard, a pointing device (mouse, tablet, or the like), a button, or a touch panel. The operation unit 32 is operated by the user to input an instruction to the user terminal 300. The operation unit 32 may be an interface for connecting one or more input devices to the user terminal 300. In this case, the operation unit 32 inputs, to the user terminal 300, an input signal generated in response to an input of the user with the input device. In general, the operation unit 32 may be configured in various ways as long as the instruction from the user can be input to the user terminal 300.

The display unit 33 is an image display device such as a liquid crystal display or an organic EL display. The display unit 33 displays, for example, image data of the operation screen that has been received from the image forming device 100. The display unit 33 may be an interface for connecting an image display device to the user terminal 300. In this case, the display unit 33 generates a video signal for displaying the image data and outputs the video signal to the image display device connected thereto.

The storage unit 34 can be a storage device such as a magnetic hard disk device or a semiconductor storage device. The storage unit 34 stores data used by the control unit 35. The storage unit 34 may function as, for example, a user information storage unit 341.

The user information storage unit 341 stores information ("user information") about a user who operates the user terminal 300. The user information may include, for example, user identification information and authentication information.

The control unit 35 comprises a processor such as a CPU, and a memory. The control unit 35 functions as a remote control unit 351 and a printer control unit 352 when the processor executes a program. In other examples, all or a part of described functions of the control unit 35 may be implemented by using dedicated hardware such as an application specific integrated circuit (ASIC), a programmable logic device (PLD), and/or a field-programmable gate array (FPGA) device. The program may be recorded on a non-transitory computer-readable recording medium. In this context, a computer-readable recording medium refers to a portable medium such as a flexible disk, a magneto-optical disk, a ROM, a CD-ROM, or a semiconductor storage device (for example, an SSD), or a storage device such as a hard disk or a semiconductor storage device built in a computer system. In some examples, the program may be transmitted or accessed via a telecommunication line or computer network.

The remote control unit 351 receives screen information from the image forming device 100 via the communication unit 31. The remote control unit 351 generates an image signal based on the received screen information and displays the image signal via the display unit 33. The remote control unit 351 generates information indicating a user input operation and transmits the information to the image forming device 100 in response to the operation performed on the operation unit 32 by the user.

The printer control unit 352 controls the user printer 400. For example, the printer control unit 352 instructs the user printer 400 to form an image based on document data. In this case, the user printer 400 may form an image in response to an instruction (command) from the printer control unit 352.

Figure 4:
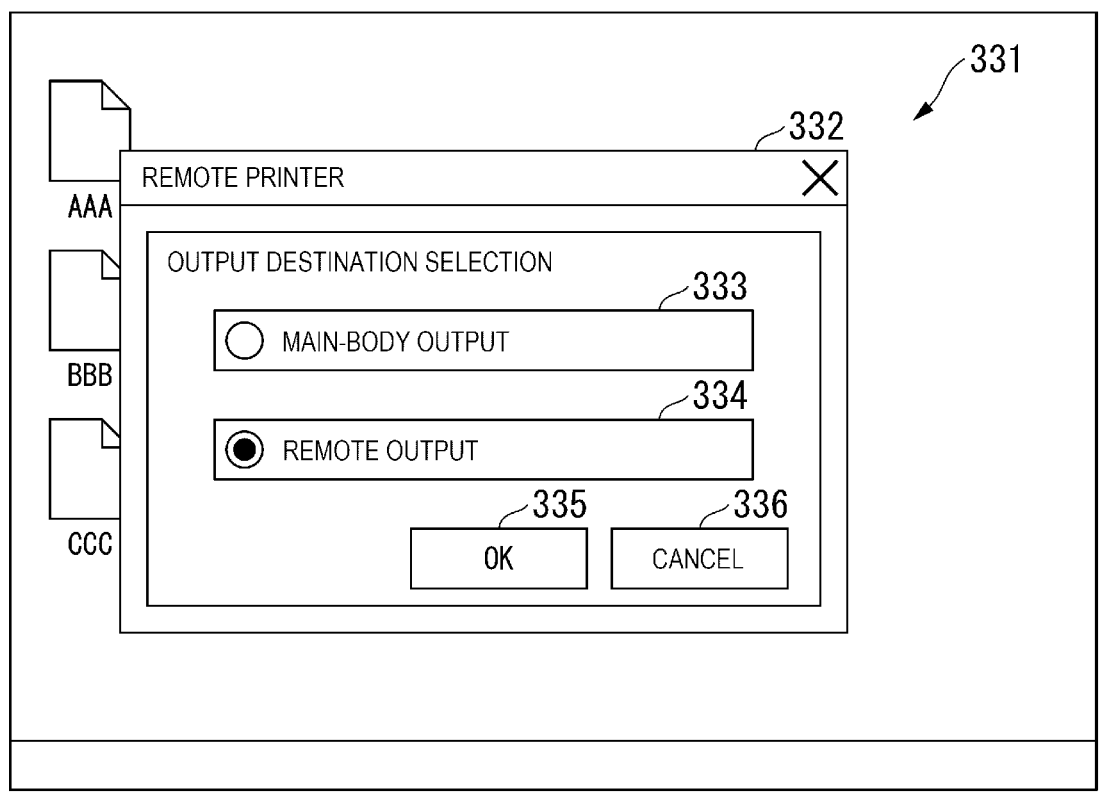
FIG. 4 is a diagram illustrating a specific example of an operation screen.

FIG. 4 is a diagram illustrating a specific example of an operation screen. For example, the operation screen may be displayed on an entire desktop screen 331 of the user terminal 300, or may be displayed in a window displayed in a part of the desktop screen 331. In the example of FIG. 4, an operation screen 332 is displayed in one window. A screen (operation screen) displayed on the display 110 of the image forming device 100 is also displayed on the operation screen 332.

On the operation screen 332, for example, buttons for operating the image forming device 100, radio buttons indicating options, character strings (text), images, and the like can be displayed. In the example of FIG. 4, a screen for selecting an output destination for an image forming job is displayed as the operation screen 332. As options, an image 333 including a radio button for selecting "main-body output" and an image 334 including a radio button for selecting "remote output" are displayed.

The output destination indicates a device at which image formation is to be actually performed for completion of the image forming job. For example, the "main-body output" option indicates that the image forming job is to be executed by the image forming device 100. For example, the "remote output" option indicates that the image forming job is to be executed by the user printer 400. When an OK button 335 is operated after either the main-body output or the remote output option is selected, a process related to the selected output is executed by the image forming device 100 or the user printer 400. When a cancel button 336 is operated, the screen returns to a previous operation screen.

Figure 5:
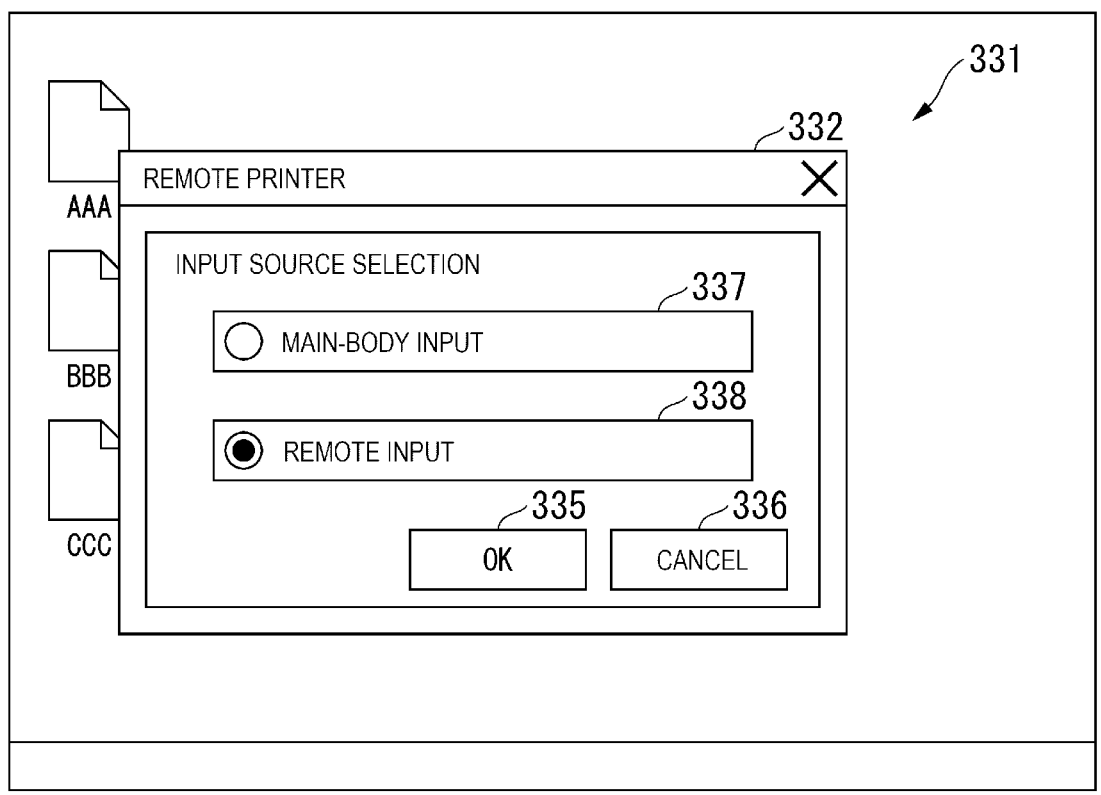
FIG. 5 is a diagram illustrating another specific example of the operation screen.

FIG. 5 is a diagram illustrating another specific example of an operation screen. On the operation screen 332 of FIG. 5, a screen for selecting an input source of an image reading job is displayed as the operation screen 332. As options, an image 337 including a radio button for selecting "main-body input" and an image 338 including a radio button for selecting "remote input" are displayed.

The input source indicates a device at which image reading will actually be performed for the image reading job. For example, "main-body input" indicates that the image reading job is to be executed by the image forming device 100. For example, "remote input" indicates that the image reading job is to be executed by the user printer 400. In this case, the user printer 400 would need to have an image reading (scanning) function.

When the OK button 335 is operated after either the main-body input or the remote input is selected, a process related to the selected input is executed by the image forming device 100 or the user printer 400. When the cancel button 336 is operated, the screen returns to the previous operation screen.

Figure 6:
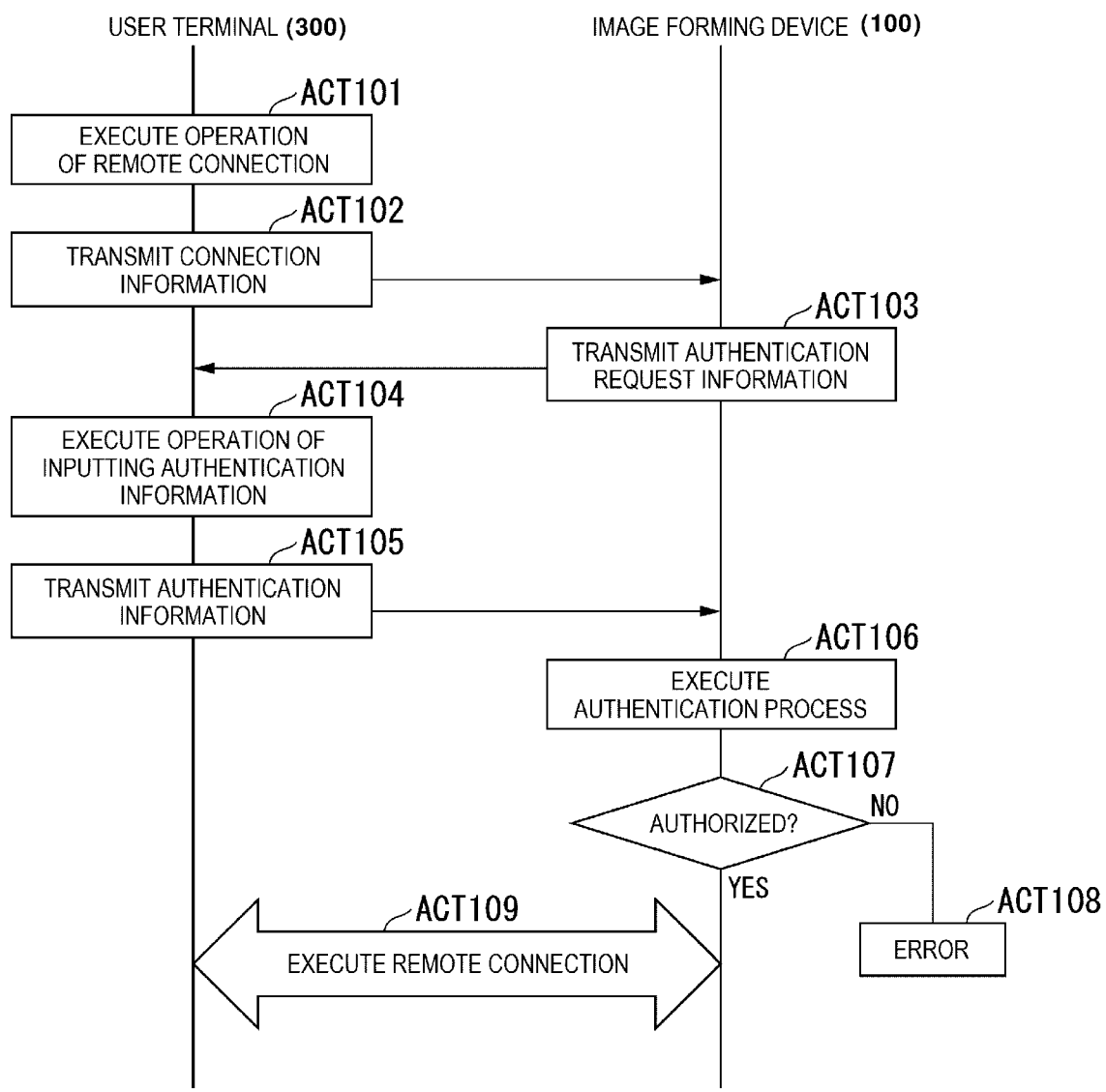
FIG. 6 is a sequence chart illustrating a specific example of operations of an image forming system.

FIG. 6 is a sequence chart illustrating a specific example of operations of the image forming system 600. First, the user operates the user terminal 300 to perform an operation indicating that the remote connection is to be started (ACT 101). The remote control unit 351 of the user terminal 300 transmits connection information to the image forming device 100 (ACT 102). The connection information may include, for example, information indicating that the remote connection is to be started, identification information indicating the user terminal 300, and user information (for example, user identification information) associated with the present user of the user terminal 300.

The remote control unit 171 of the image forming device 100 transmits authentication request information to the user terminal 300 (ACT 103). The authentication request information requesting authentication information necessary for a remote connection to be started. When the remote control unit 351 of the user terminal 300 receives the authentication request information, the remote control unit 351 displays, on the display unit 33, a screen that prompts input of the required authentication information. The user performs an operation of inputting authentication information based on this screen (ACT 104). The remote control unit 351 transmits the authentication information input by the user to the image forming device 100 (ACT 105).

When the remote control unit 171 of the image forming device 100 receives the authentication information, the remote control unit 171 performs an authentication process based on the received authentication information (ACT 106). If the authentication is not successful (NO in ACT 107), the process ends with an error (ACT 108). If the authentication is successful (Yes in ACT 107), a remote connection is started between the user terminal 300 and the image forming device 100 (ACT 109).

Figure 7:
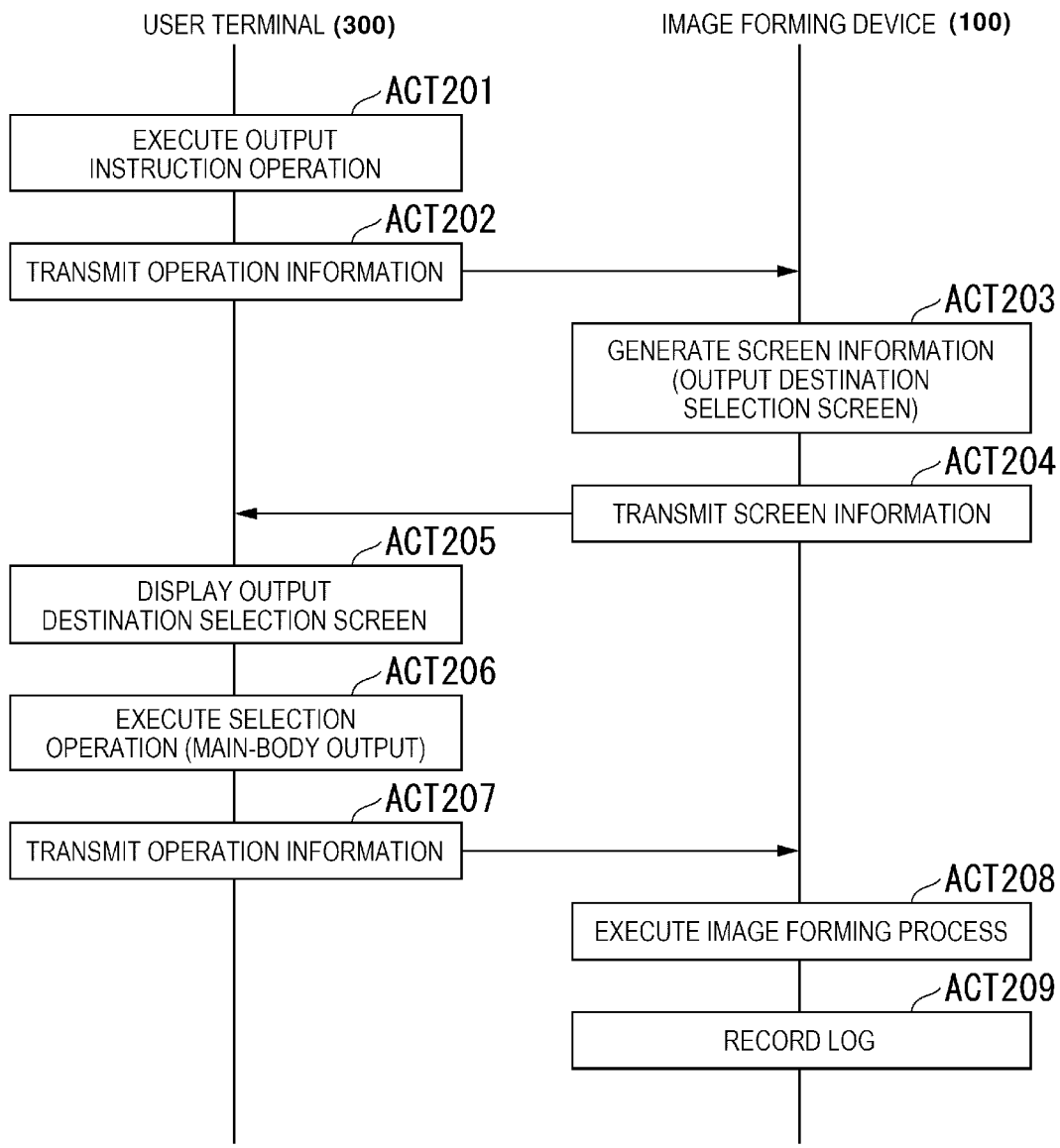
FIG. 7 is a sequence chart illustrating another specific example of operations of an image forming system.

FIG. 7 is a sequence chart illustrating another specific example of operations of the image forming system 600. A process illustrated in FIG. 7 begins after the remote connection has already been started. The process illustrated in FIG. 7 is a process for outputting document data recorded in the image forming device 100. First, the user operates the user terminal 300 to select the document data to be output and to perform an operation for instructing the output of the selected document data (ACT 201). The remote control unit 351 of the user terminal 300 transmits information (operation information) corresponding to the operation(s) of the user to the image forming device 100 (ACT 202).

The image forming device 100 updates the operation screen in accordance with the received operation information, and generates information of the updated screen (ACT 203). For example, in the example of FIG. 7, screen information indicating an output destination selection screen (screen of FIG. 4) is generated. The image forming device 100 transmits the generated screen information to the user terminal 300 (ACT 204). When the user terminal 300 receives the screen information, the user terminal 300 displays, on the display unit 33, a screen corresponding to the received screen information (ACT 205). In the example of FIG. 7, the user selects "main-body output" on the output destination selection screen (ACT 206). In response to the selection of the main-body output (ACT 207), the job control unit 172 of the image forming device 100 reads out the document data selected by the user from the document data storage unit 162, and executes a print job with the image forming unit 130 (ACT 208). The job control unit 172 records log information related to the executed image forming process (job) (ACT 209).

Figure 8:
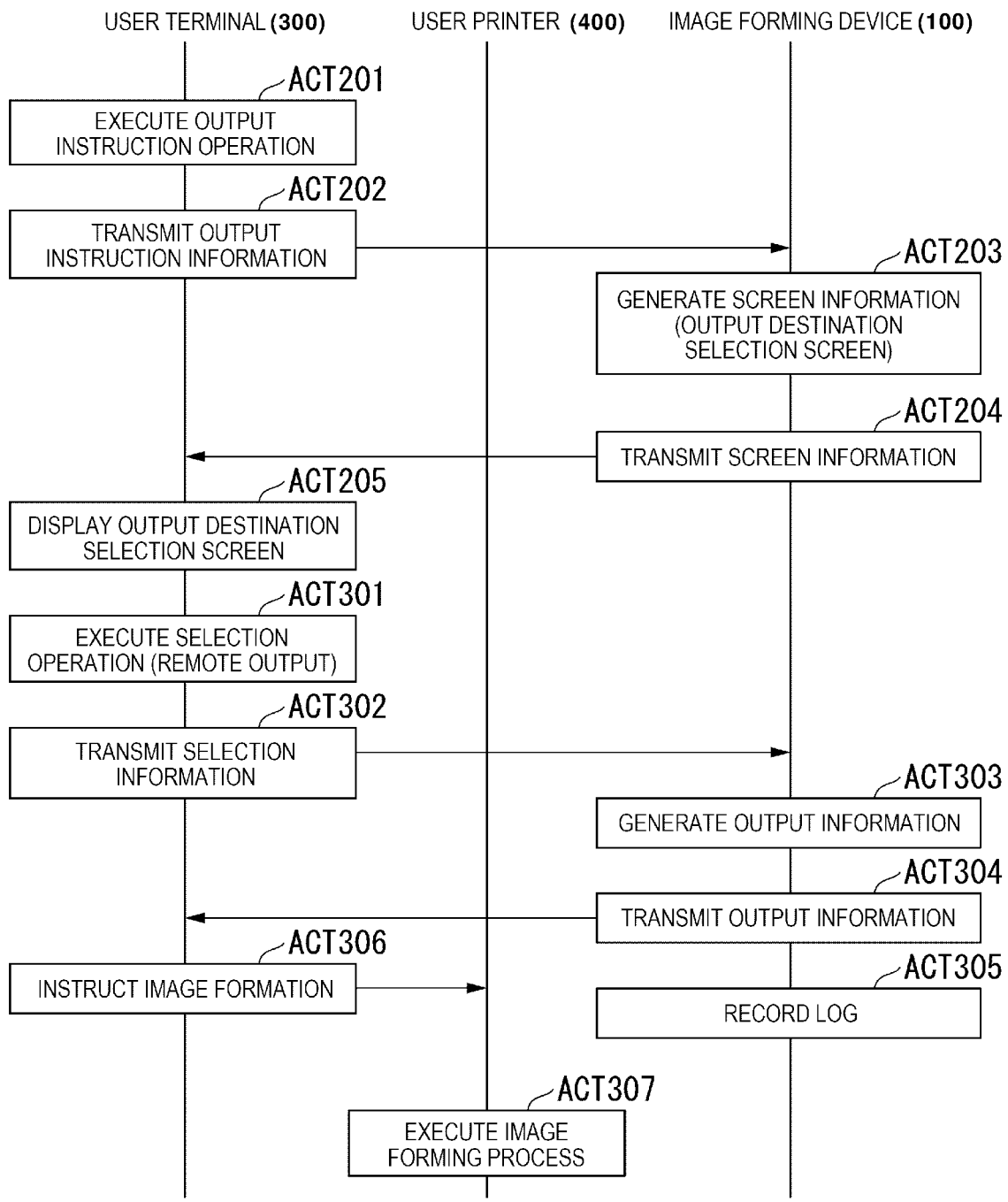
FIG. 8 is a sequence chart illustrating yet another specific example of operations of an image forming system.

FIG. 8 is a sequence chart illustrating yet another specific example of operations of the image forming system 600. A process illustrated in FIG. 8 is different from the process illustrated in FIG. 7 in that the "remote output" option is selected rather than "main-body output". ACT 201 to ACT 205 in FIG. 8 are the same as ACT 201 to ACT 205 in FIG. 7, and thus additional description thereof will be omitted.

In the example of FIG. 8, the user selects "remote output" on the output destination selection screen (ACT 301). In response to the selection of the remote output option (ACT 302), the job control unit 172 of the image forming device 100 reads out the document data selected by the user from the document data storage unit 162, and generates output information based on the document data (ACT 303). The job control unit 172 transmits the output information to the user terminal 300 (ACT 304). The job control unit 172 records log information related to the executed output information (ACT 305).

When the output information is received from the image forming device 100, the printer control unit 352 of the user terminal 300 instructs the connected user printer 400 to execute image formation corresponding to the output information (ACT 306). The user printer 400 then executes the image forming process corresponding to the instruction (ACT 307).

Figure 9:
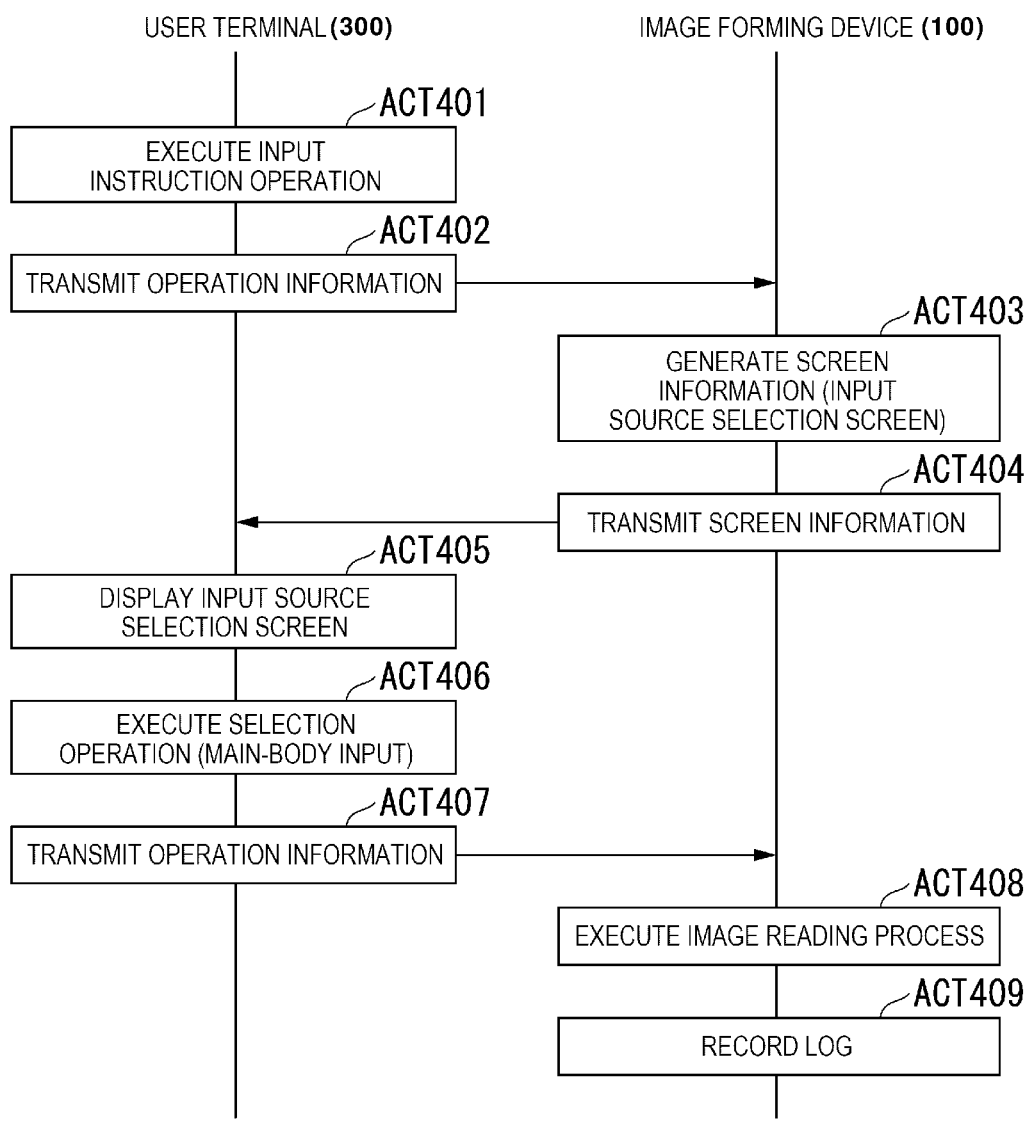
FIG. 9 is a sequence chart illustrating still another specific example of operations of an image forming system.

FIG. 9 is a sequence chart illustrating a still further specific example of operations of the image forming system 600. A process illustrated in FIG. 9 is started with the remote connection is already started. The process illustrated in FIG. 9 is a process for recording the image data read by the image forming device 100 or the user printer 400 in the image forming device 100. First, the user operates the user terminal 300 to perform an operation for instructing the reading (scanning) of an image (ACT 401). The remote control unit 351 of the user terminal 300 transmits information (operation information) indicating the operation(s) of the user to the image forming device 100 (ACT 402).

The image forming device 100 updates the operation screen in accordance with the received operation information, and generates information of the updated screen (ACT 403). For example, in the example of FIG. 9, screen information indicating an input source selection screen (screen of FIG. 5) is generated. The image forming device 100 transmits the generated screen information to the user terminal 300 (ACT 404). When the user terminal 300 receives the screen information, the user terminal 300 displays, on the display unit 33, a screen corresponding to the received screen information (ACT 405). In the example of FIG. 9, the user selects "main-body input" on the input source selection screen (ACT 406). In response to the selection of the main-body input option (ACT 407), the job control unit 172 of the image forming device 100 executes an image reading process by controlling the image reading unit 10 (ACT 408). The job control unit 172 records log information related to the executed image reading process (ACT 409).

Figure 10:
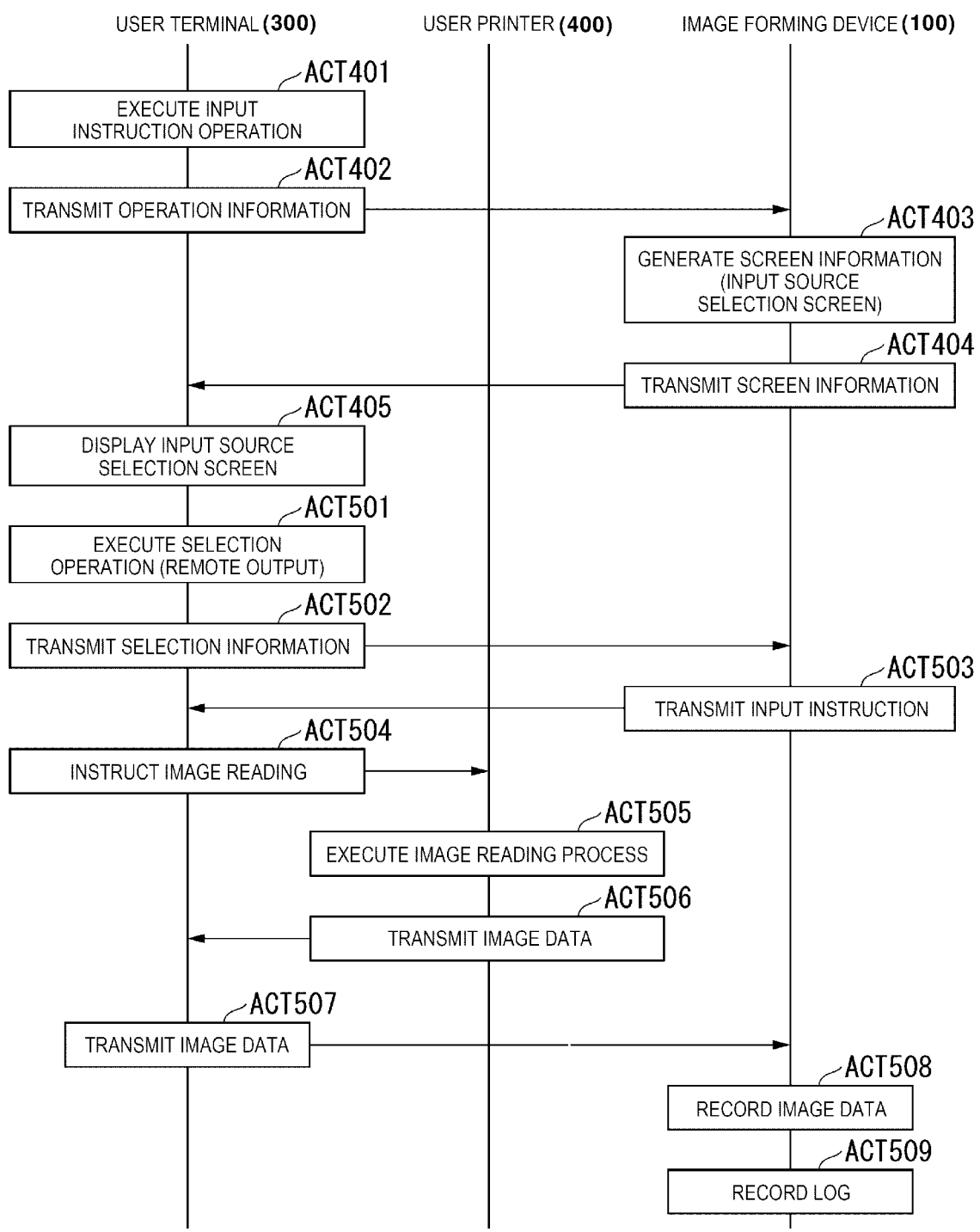
FIG. 10 is a sequence chart illustrating still another specific example of operations of an image forming system.

FIG. 10 is a sequence chart illustrating yet a still further specific example of operations of the image forming system 600. A process illustrated in FIG. 10 is different from the process illustrated in FIG. 9 in that the remote input option is selected. ACT 401 to ACT 405 in FIG. 10 are the same as ACT 401 to ACT 405 in FIG. 9, and thus additional description thereof will be omitted.

In the example of FIG. 10, the user selects "remote input" on the input source selection screen (ACT 501). In response to the selection of the remote input option (ACT 502), the job control unit 172 of the image forming device 100 transmits an execution instruction for an image reading (scanning) to the user terminal 300 (ACT 503). In response to the execution instruction, the printer control unit 352 of the user terminal 300 instructs the user printer 400 to execute the image reading process (ACT 504).

The user printer 400 executes the image reading process in response to the execution instruction of the user terminal 300 (ACT 505). The user printer 400 transmits image data obtained by executing the image reading process to the user terminal 300 (ACT 506). The user terminal 300 then transmits the received image data to the image forming device 100 (ACT 507). The job control unit 172 of the image forming device 100 records the received image data as document data in the document data storage unit 162 (ACT 508). The job control unit 172 records log information related to the executed output information (ACT 509).

In the image forming system 600 configured as described above, the image formation (printing) of the document data stored in the image forming device 100 can be performed based on instructions or requests from the user terminal 300 via the external network. At this time, the output destination for image formation may be selected as the image forming device 100 or the user printer 400 connected to the user terminal 300. Therefore, user convenience can be improved when the user accesses the image forming device 100 via the external network (for example, the network 500).

In the image forming system 600 configured as described above, image data obtained by executing a reading process on an image formed on a sheet by the user printer 400 can be recorded in the image forming device 100. Therefore, user convenience can be improved when the user accesses the image forming device 100 via the external network (for example, the network 500).

Modified Example

Figure 11:
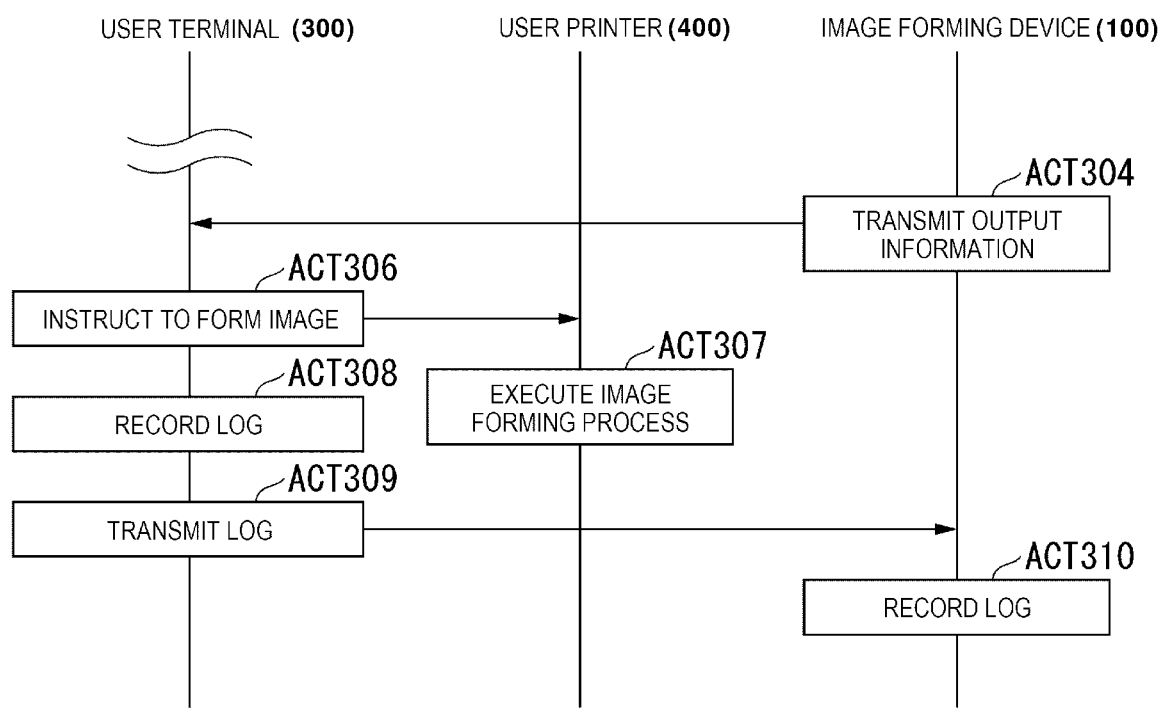
FIG. 11 is a sequence chart illustrating a modified example of operations of an image forming system.

FIG. 11 is a sequence chart illustrating a modified example of operations of the image forming system 600. In FIG. 11, after the processes up to ACT 307 in FIG. 8 have been executed again, the printer control unit 352 of the user terminal 300 records a log of the image forming process for the user printer 400 (ACT 308). For example, the printer control unit 352 records the number of sheets on printed in the image forming process. The remote control unit 351 transmits the recorded log information to the image forming device 100 at a predetermined timing or the like (ACT 309). The remote control unit 171 of the image forming device 100 records the received log information in the log storage unit 163 (ACT 310).

With this configuration, log information related to image formation executed on the user printer 400 can be recorded in the image forming device 100. For example, the log information may include information about the number of times image formation has been executed and/or the number of sheets used in image formation. In this case, information including the number of image formations executed by the user printer 400 and the number of sheets used therein, and the number of image formations executed by the image forming device 100 and the number of sheets used therein can be recorded.

That is, the remote control unit 171 of the image forming device 100 may record, as information recorded in the log storage unit 163, a value obtained by adding the number of the image formations executed by the user printer 400 and the number executed by the image forming device 100. The remote control unit 171 of the image forming device 100 may record, as information recorded in the log storage unit 163, a value obtained by adding the number of sheets used in the image formations executed by the user printer 400 and the number of sheets used in the image formations executed by the image forming device 100.

The remote control unit 171 may record the number of times and the number of sheets used for each user. In this case, the remote control unit 351 of the user terminal 300 may be configured to transmit its own identification information along with user identification information in association with each other when transmitting the log information. With such a configuration, the number of executions of the image forming process and the number of sheets used can be recorded in the image forming device 100 for each user.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A control method for an image forming system, the control method comprising:
   establishing a remote connection to a first image forming device from a user terminal;
   receiving, at the user terminal, screen information generated by the first image forming device and transmitted from the first image forming device via the remote connection;
   displaying the generated screen information on a display of the user terminal;
   receiving a user input at the user terminal corresponding to the displayed screen information;
   transmitting the user input to the first image forming device;
   receiving document data at the user terminal from the first image forming device in response to the user input;
   sending the received document data to a second image forming device connected to the user terminal;
   causing the second image forming device to print the document data; and
   after causing the second image forming device to print the document data, transmitting log information to the first image forming device from the user terminal, wherein
   the log information includes a user identification associated with the user terminal and an information indicating the document data was printed by the second image forming device.

2. The control method according to claim 1, wherein the second image forming device is directly connected to the user terminal.

3. The control method according to claim 1, wherein the second image forming device is directly connected to the user terminal.

4. The control method according to claim 1, wherein the second image forming device is wirelessly connected to the user terminal.

5. The control method according to claim 1, wherein the transmitted user input causes the first image forming device to print document data that is stored in the first image forming device.

6. A control method for an image forming system, the control method comprising:
   establishing a remote connection to a first image forming device from a user terminal;
   receiving, at the user terminal, screen information generated by the first image forming device and transmitted from the first image forming device via the remote connection;
   displaying the generated screen information on a display of the user terminal;
   receiving a user input at the user terminal corresponding to the displayed screen information;
   transmitting the user input to the first image forming device; and
   transmitting document data generated by a second image forming device from the user terminal to the first image forming device, wherein the screen information requests a user selection of an output destination for the document data generated by the second image forming device.

7. An image forming system, comprising:
a first image forming device;
a second image forming device; and
a user terminal configured to:
  establish a remote connection to the first image forming device;
  receive screen information generated by the first image forming device and transmitted from the first image forming device via the remote connection;
  display the generated screen information on a display of the user terminal;
  receive a user input corresponding to the displayed screen information;
  transmit the user input to the first image forming device; and
  transmit document data generated by a second image forming device to the first image forming device, wherein
the screen information requests a user selection of an output destination for the document data generated by the second image forming device.

8. The image forming system according to claim 7, wherein the user terminal is further configured to:
receive document data from the first image forming device in response to the user input.

9. The image forming system according to claim 8, wherein the user terminal is further configured to:
  send the received document data to the second image forming device; and
  cause the second image forming device to print the document data.

10. The image forming system according to claim 9, wherein the second image forming device is directly connected to the user terminal.

11. The image forming system according to claim 9, wherein the user terminal is further configured to:
  transmit log information to the first image forming device after causing the second image forming device to print the document data, wherein
  the log information includes a user identification associated with the user terminal and an information indicating the document data was printed by the second image forming device.

12. The image forming system according to claim 7, wherein the transmitted user input causes the first image forming device to print document data that is stored in the first image forming device.

* * * * *